United States Patent [19]

Knowles

[11] Patent Number: 5,481,509

[45] Date of Patent: Jan. 2, 1996

[54] JUKEBOX ENTERTAINMENT SYSTEM INCLUDING REMOVABLE HARD DRIVES

[75] Inventor: Norman Knowles, Richmond, Canada

[73] Assignee: Software Control Systems, Inc., Richmond, Canada

[21] Appl. No.: 308,747

[22] Filed: Sep. 19, 1994

[51] Int. Cl.[6] .................................................. G11B 17/22
[52] U.S. Cl. ...................................... 369/30; 340/825.35
[58] Field of Search ................................. 369/30, 32, 36, 369/27, 38, 39, 34, 11, 12; 84/609, 625; 360/55, 92, 33.1, 137, 12; 194/217, 239; 358/335; 340/825.35; 379/67–68

[56] References Cited

U.S. PATENT DOCUMENTS

| | | | |
|---|---|---|---|
| 4,173,024 | 10/1979 | Miller | 358/310 X |
| 4,647,989 | 3/1987 | Geddes | 360/55 |
| 4,667,802 | 5/1987 | Verduin et al. | 194/217 |
| 4,688,105 | 8/1987 | Bloch et al. | 358/335 |
| 4,789,907 | 12/1988 | Fischetti et al. | 360/33.1 |
| 4,965,673 | 10/1990 | Bozzo et al. | 358/335 |
| 5,099,337 | 3/1992 | Cury | 358/335 |
| 5,144,454 | 9/1992 | Cury | 358/335 |
| 5,341,350 | 8/1994 | Frank et al. | 369/30 |

FOREIGN PATENT DOCUMENTS

| | | |
|---|---|---|
| 4303056 | 8/1993 | European Pat. Off. . |
| 60-66382 | 4/1985 | Japan . |

*Primary Examiner*—Ali Neyzari
*Attorney, Agent, or Firm*—Christensen, O'Connor, Johnson & Kindness

[57] ABSTRACT

An audio/video jukebox has a plurality of hard disc drives each having digital audio/video data corresponding to a plurality of audio/video titles stored thereon. A computer system reads data corresponding to a selected audio/video title from the disc drives and converts the data to an analog audio and video signal. The video signal is applied to a television monitor while the audio signal is coupled to a karaoke-type audio amplifier. The jukebox further includes a video tape recorder and a video camera that allows a user to record a video image. A microphone can be coupled to the karaoke-type audio amplifier so that the user can sing along with a selected audio/video title. The jukebox allows a user to view lists of titles stored on the hard disc drives by format (music, karaoke and video) as well as by genre (new titles, rock/pop, comedy, and country).

16 Claims, 7 Drawing Sheets

JUKEBOX ENTERTAINMENT SYSTEM INCLUDING REMOVABLE HARD DRIVES

FIELD OF THE INVENTION

The present invention relates to entertainment systems in general, and in particular to jukebox entertainment systems.

BACKGROUND OF THE INVENTION

Despite recent advances in music recording and computer technology, the typical jukebox of the type found in bars, entertainment areas, and the like, has changed little since coin operated record players were first introduced. The failure of prior art jukebox systems to take advantage of modem technology, as well as their high cost of maintenance and repair, has contributed to a significant decline in the popularity of the jukebox as an entertainment system.

Even though modem jukeboxes have replaced old 45 rpm records with digital CDs, all modern jukeboxes still utilize complex CD changing mechanisms that move a selected disc from a storage rack to a CD player after the user has deposited a predetermined amount of money. The changing mechanisms are the most common cause of jukebox failure and the most expensive part to repair. There is therefore a need for a jukebox system that operates without a changing mechanism in order to increase reliability and decrease the need for periodic maintenance.

Another problem with prior art jukeboxes that has contributed to a decline in their popularity is a failure to take advantage of currently available entertainment formats. In the past, a jukebox could play only audio selections. However, now the public is demanding to see music videos that show the artists performing an audio selection or a display of other visual images as the audio selection is played. To meet the desire of customers who want to see such music videos, many entertainment establishments such as bars or dance clubs often play music video cable channels on one or more TV monitors located throughout the establishment. The disadvantage of this is that a user cannot select what music video he or she is shown and must endure any commercial interruptions shown by the cable channel.

One other type of currently popular entertainment not provided by prior art jukeboxes is karaoke. In karaoke, a participant sings the words of a song as they are displayed on a video screen while the background music to the song is played through a loudspeaker system. In the past, if a club wanted to provide karaoke entertainment it was necessary to purchase a separate karaoke system. Not only does this result in extra equipment that must be purchased and maintained, but a separate karaoke system typically requires an additional operator to play selections. Therefore, there is a need for a jukebox system that allows a user to enjoy these newer types of entertainment.

SUMMARY OF THE INVENTION

The present invention is an audio/video jukebox entertainment system that allows a user to enjoy both audio and video forms of entertainment. The jukebox system includes a first computer system having one or more hard disc drives coupled thereto, each of which has digital audio/video data stored thereon. A second computer system is networked with the first computer system and provides a selection means to allow a user to select one or more audio/video titles to be played. Once a user has selected an audio/video title, the selection is transferred to the first computer system which in turn reads the corresponding audio/video data from the one or more hard disc drives. A decoder is coupled to the first computer system for convening the digital audio/video data that has been read from the one or more hard drives to an analog audio/video signal. The analog video signal is supplied to an input of a television monitor in order to display the analog video signal. The analog audio signal is supplied to a karaoke-type audio amplifier that drives one or more loudspeakers in order to convert the amplified audio signal to sound.

The audio/video jukebox further comprises a video cassette recorder having a video output coupled to the television monitor and an audio output coupled to the karaoke-type audio amplifier. A video camera is also provided to allow a user to record his or her image onto a video tape. A microphone that is connectable to the karaoke-type audio amplifier is also provided. The microphone allows a user to sing along with a karaoke song played on the jukebox.

The jukebox may also include a coupon primer that is coupled to the second computer. As certain titles are chosen, a discount coupon to promote the sale or rental of an item associated with the title will print out.

The second computer system in the audio/video jukebox sorts and displays the audio/video data stored on the hard drives by format and genre. Each selection on the jukebox is sorted according to whether the selection is audio only, video (i.e., includes both a video image and accompanying audio), or karaoke (i.e., includes a video image and background audio). Within each type of format, each selection is sorted by genre, such as new selections, rock/pop, country, and comedy. The sorting functions allow a user to quickly view their favorite titles stored in the jukebox without having to read a single list of all the titles available.

The first computer system includes means for determining whether the jukebox has sat idle for more than a predetermined amount of time, and if so, causes a commercial to be played.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
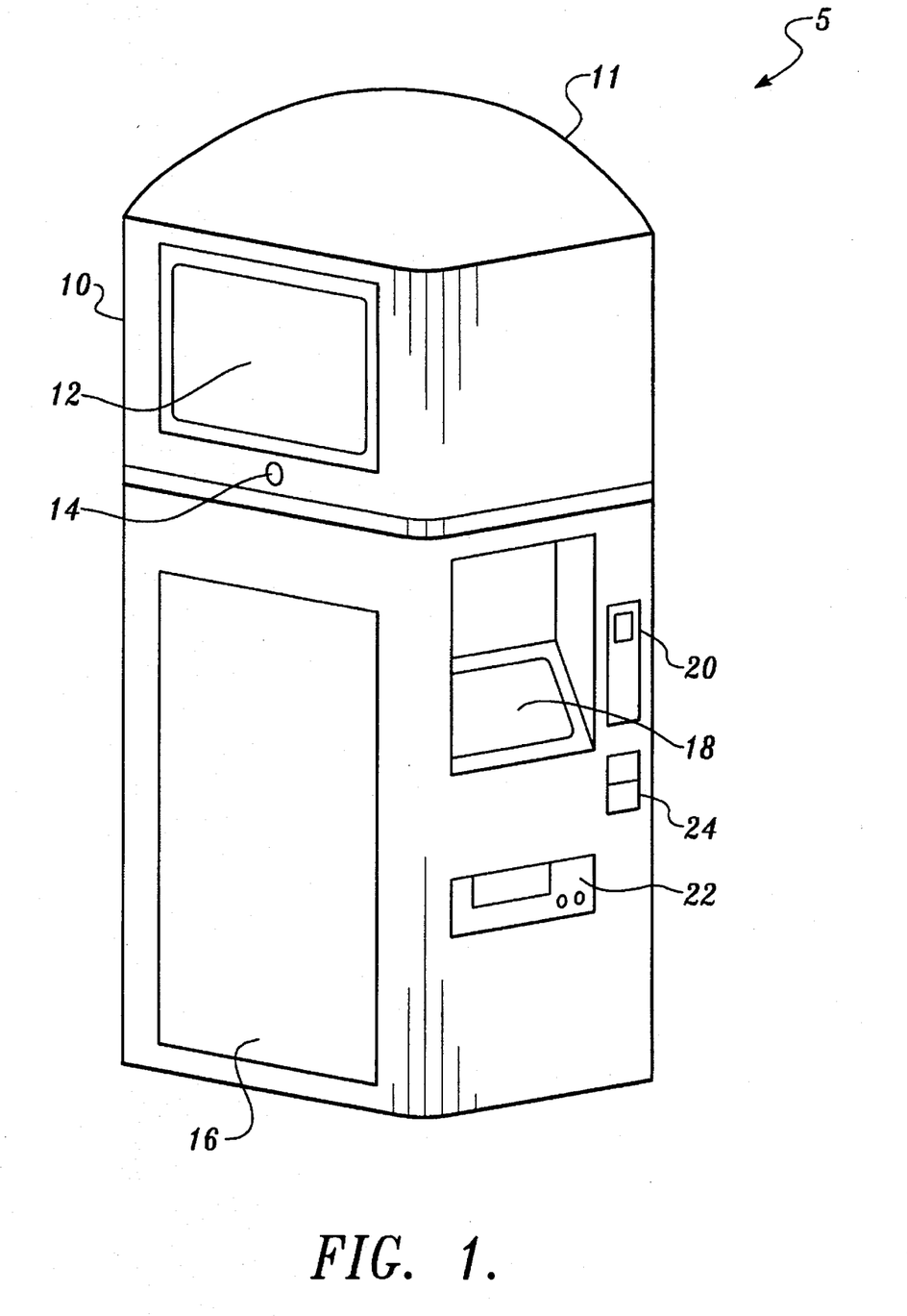
FIG. 1 is an isometric view of the audio/video jukebox according to the present invention.

Referring now to FIG. 1, the audio/video jukebox system 5 according to the present invention is housed in a generally rectangular cabinet 10 having a from face, a rear face and two opposing side faces. The front and rear faces are slightly wider than the side faces of the cabinet. The cabinet has a rounded cover or dome 11.

A television monitor 12 is disposed in the front face of the jukebox 5. A lens 14 of a video camera (not shown) is mounted substantially flush with the front face of the jukebox at a position below the center of the television monitor 12. Below the lens 14 is a commercial display 16 that can comprise either a simple backlighted display or a revolving unit that continually rotates a series of commercial images in the front of the cabinet 10.

On the right side face of the cabinet 10 is a touch sensitive computer display screen 18, a money validator 20, a video cassette recorder 22, and a coupon printer 24. The touch sensitive screen 18 lies recessed in the cabinet such that a front face of the computer display screen points upwardly so as to be easily read by a user. To the right of the touch sensitive screen 18 is the money validator 20. The money validator is mounted substantially flush with the side face of the cabinet. Below the touch screen 18 and the money validator 20 is the video cassette recorder 22. Below the money validator 20 is the coupon printer 24. The operation of each of the above-described components will be described in further detail below.

Figure 2:
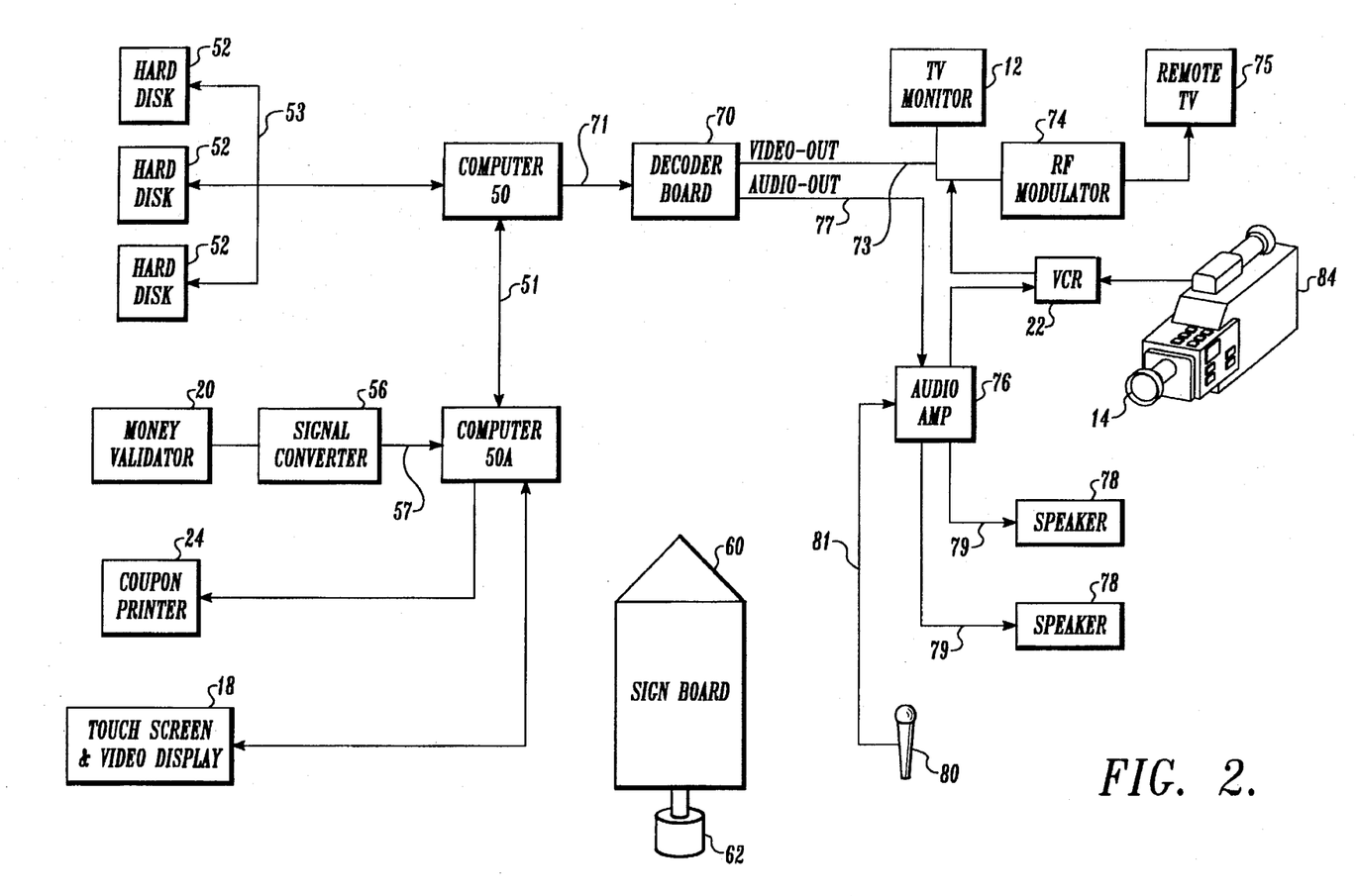
FIG. 2 is a block diagram of the audio/video jukebox according to the present invention.

Referring now to FIG. 2, the audio/video jukebox of the present invention includes a pair of networked computer systems 50 and 50A. As will be described in further detail below, the computer system 50 is used to play digital audio/video data stored in the jukebox, while the computer system 50A allows a user to make selections of the titles which the user chooses. Each computer system 50 and 50A contains a network card (not shown) that allows the computers to communicate over a bus 51. In a representative embodiment, both computer system 50 and computer system 50A can be 486 IBM computer compatible.

Coupled to the computer system 50 by a set of common bus lines 53 are one or more hard disc drives 52. In addition to storing a computer program that causes the computer system to operate the jukebox, the hard disc drives store the titles that can be played on the jukebox. Preferably the hard drives 52 can be easily disconnected from the computer system 50 and removed from the jukebox so that the audio/video titles available on the jukebox can be easily updated by simply swapping the old hard drives with a new set of hard drives having new audio/video titles stored thereon.

Coupled to the computer system 50A is the money validator 20 and a signal converter 56. The money validator 20 receives currency from the user and generates an electrical signal each time a predetermined amount of currency has been received. The money validator 20 is a commonly available part, model number GL5, available from Mars Electronics International of 1301 Wilson Drive, West Chester, Pa. 19380 USA. The output signal produced by the money validator is coupled to a signal converter 56 model number MR2000KB, available from Specialized Digital Micro Systems, Ltd. of Richmond B.C., Canada. The signal converter produces an output signal on a lead 57 that is coupled to a keyboard input of the computer system 50A. The signal converter 56 is placed between the money validator and a keyboard input of the computer system. The signal converter 56 receives the electrical output signal produced by the money validator 20 and translates it to a serial ASCII signal representing a keyboard stroke that would be produced by a conventional computer keyboard. In the present embodiment of the invention, the signal converter 56 converts the electrical output signal from the money validator 20 to an ASCII "m" code and applies the code to the keyboard input of the computer system. Each time a minimum amount of money is received by the money validator (e.g., 25¢ or $1), the "m" signal is produced by the signal converter 56 to be read by the computer system 50A. The computer system 50A counts the number of "m" signals to determine when a sufficient amount of money has been received from a user in order to allow a selection on the jukebox to be played.

The touch screen 18 is coupled to the computer system 50A in a conventional manner, thereby allowing the computer system to present the user with a menu including directions for operating the jukebox system as well as a list of audio/video titles that can be selected.

The jukebox system further includes a commercial display 16 that comprises either a single backlit poster as shown in FIG. 1 or could comprise a rotating sign board 60 as shown on FIG. 2. The rotating sign board 60 is a rotatable mechanism having a triangular frame that presents one of three different images to the front of the jukebox. If the rotating sign board 60 is used, a motor 62, and an appropriate drive system (not shown) is placed at the bottom of the jukebox. The motor 62 rotates the sign board 60 at the appropriate intervals.

Also coupled to the computer system 50A is the coupon printer 24 that is used by the jukebox system to print coupons for items when a particular audio/video selection is made. For example, the jukebox may print a coupon for a CD when a song from the CD is selected by a user. As will be described below, the information concerning the coupon such as the discount amount, the expiration date, the redeeming merchant etc., is stored on the hard disc drives along with the digital audio/video data that comprises the selection.

To convert the digital audio/video data stored on the hard disc drives 52 to an analog signal that can be displayed on a television monitor or played through a set of speakers, the jukebox system includes a decoder board 70. In the presently preferred embodiment of the invention, the decoder board 70 comprises a PC Motion Digital Video Player available from Optibase Inc. of Dallas, Tex. and Optibase Ltd. of Herzliya 46120 Israel. The decoder board 70 is coupled to the computer system 50 by one or more leads 71 to receive the digital audio/video data that is read from the hard disc drives 52. The decoder board 70 converts the digital audio/video data to an analog video-out signal on a lead 73 and an analog audio-out signal on a lead 77. The video-out signal is coupled to the television monitor 12 in order to display the analog video signal on the front of the jukebox. The jukebox also includes an rf modulator 74 coupled to the lead 73. The rf modulator receives the video-out signal and produces a modulated television signal that can be used to further display the video signal on one or more remote televisions that may not be cable television compatible. As will be appreciated, the rf modulator 74 allows the jukebox 10 to drive additional televisions, such as a projection screen television, so that music videos played on the jukebox can be shown on a large screen such as those found in dance clubs.

The audio-out signal produced by the decoder board 70 is applied to an input of a karaoke-type, stereo audio amplifier 76. The audio amplifier 76 amplifies the analog audio-out signal to a sufficient power level in order to drive one or more speakers 78. The power requirements of the audio amplifier 76 are determined by the environment in which the jukebox is to be used. For example, in large bars or dance clubs, it may be necessary to provide an audio amplifier having high output power capabilities. In general, an amplifier having 100 watts per channel is sufficient to adequately play music in most environments.

An optional microphone 80 can be coupled to the audio amplifier 76 by a lead 81. The microphone 80 is provided so that a user can sing along with the audio-out signal produced by the decoder board when a karaoke song is played. For example, if a karaoke song is played on the jukebox, a background video image including the words of the song is displayed on the television monitor 12, while the audio background music (lacking a vocal track) is played through the speakers 78. The microphone 80 allows a user to sing the words to the song and have his or her voice combined with the audio-out signal and played through the speakers 78.

As previously indicated, the jukebox includes a video camera 84 that is coupled to a video tape recorder 22 in a conventional manner. A video output of the video tape recorder 22 is coupled to the video-out line 73 of the decoder board 70 such that the user's image can be shown on the television monitor 12 or the one or more remote televisions 75. The user may use the video camera 84 and the video tape recorder 22 to record themselves performing a karaoke song or may simply record an image of themselves to send as a "video greeting."

Figure 3:
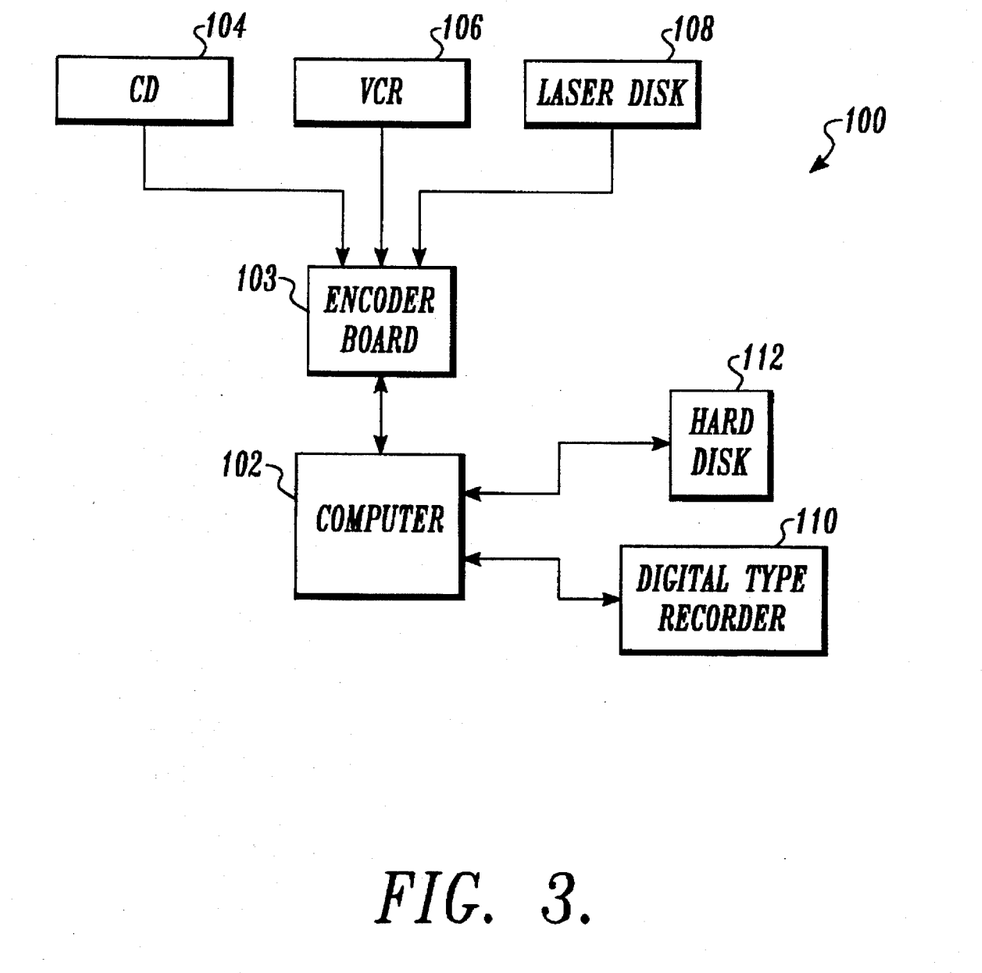
FIG. 3 is a block diagram of a computer system used to record audio/video data on a hard disc drive or a digital tape.

FIG. 3 is a block diagram of a computer system 100 that is used in conjunction with one or more remotely located jukeboxes. The computer system 100 is preferably located at a central location and is used to store a catalog of titles that can be placed on the hard disc drives found in the jukeboxes. The computer system 100 comprises a central computer 102 coupled to an analog-to-digital encoder board 103. In the presently preferred embodiment of the invention, the encoder board 103 is an MPEG Lab Pro Digital Video Compression Board made by Optibase Ltd. of Israel. The encoder board 103 operates to convert an analog audio/video signal to a digital signal which is then compressed and stored on a hard disc or on a magnetic tape.

Coupled to the encoder board are numerous audio/video players that provide the analog audio/video signals. A conventional CD player 104 is used to play compact discs into the encoder board. A video tape recorder 106 is used to play video tapes of music videos and the like, while a laser disc player 108 plays audio/video information stored in the laser disc format.

As indicated, the encoder board 103 receives the analog signals from one of the audio/video players and converts the analog signals to digital signals in the MPEG format. The digital signals can be read by the computer 102 and stored on a magnetic tape or a hard disc drive. A digital tape recorder 110, coupled to the computer 102, is used to record the audio/video information that has been converted to the MPEG format onto a magnetic tape. Alternatively, the digital signals produced by the encoder board 103 can be stored directly on a removable hard disc drive 112.

In addition to storing the digital audio/video signals on the hard disc 112 or a digital tape recorder 110, the computer system 100 stores a list of all the titles that can be copied to a hard disc drive and placed in one of the remotely located jukeboxes. To record a compilation of titles on the hard disc drive 112, a user of the computer system 100 first inserts a new hard disc into the disc drive 112. The user then records digital audio/video data that is stored in the computer system 100 or read from one or more digital tapes. Once the disc drive has a sufficient number of titles stored on it, the disc drive can be placed in one of the remotely located jukeboxes.

When not used to record the digitized audio/video information, the central computer system 102 can read a hard disc drive that has been retrieved from a remote jukebox and print out a report indicating how many times each title has been played. By determining how often a song was played, the operator of the computer system 102 can determine whether to leave the title on the hard disc or to remove the title and replace it with a more popular title. The data indicating the number of times each selection was played is also useful for calculating the amount of royalties that must be paid to the respective copyright holders of the titles. The central computer system 102 stores the selection's title, artist, and producer, as well as a file name that is used by the computer systems within the jukeboxes to read the selection from their hard disc drives. Finally, if a coupon is to be printed when a user selects the title, the information contained on the coupon is also stored on the hard disc. As indicated above, this information may include the coupon's value, the redeeming merchant, the expiration date and other information.

Figure 4A:
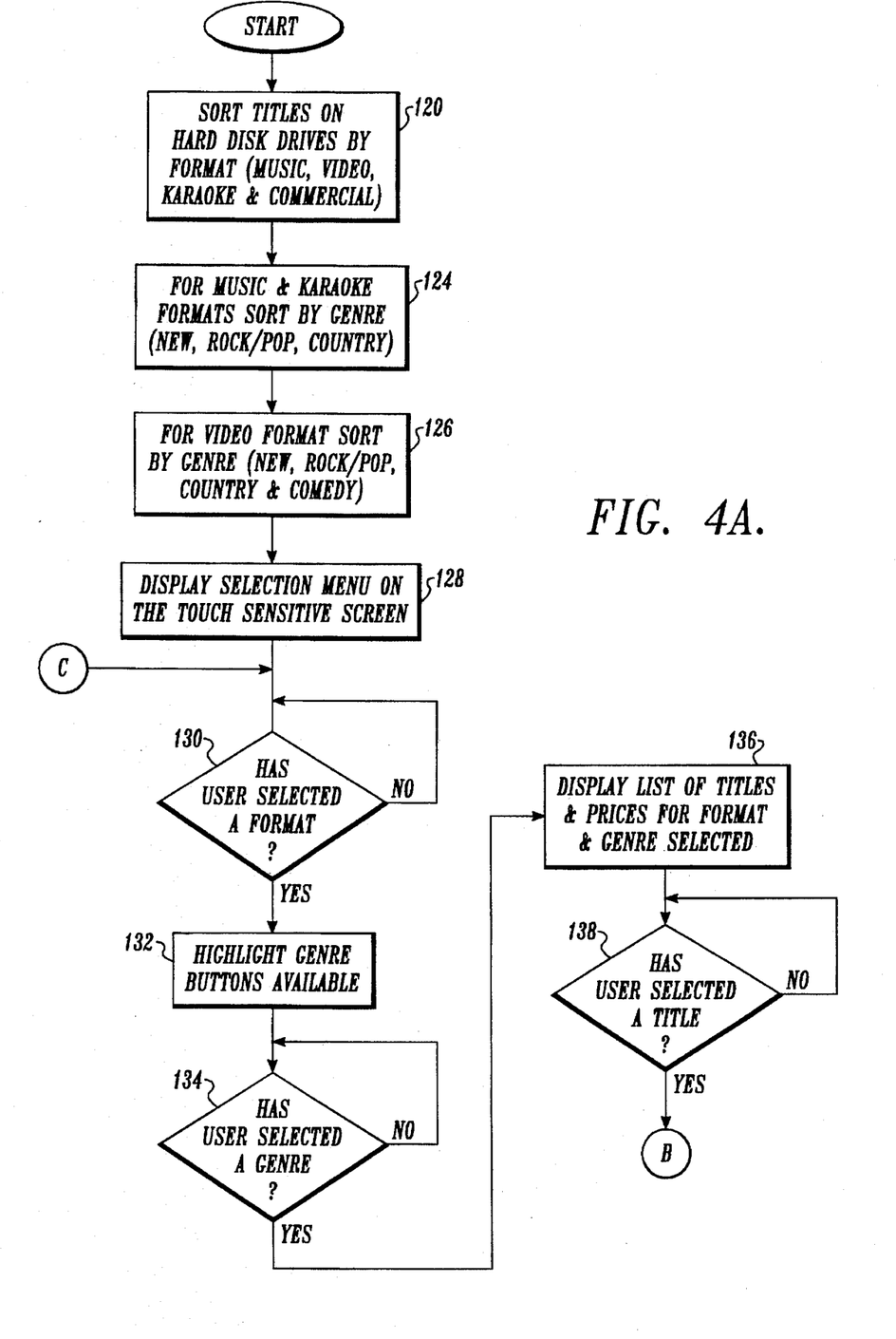
FIGS. 4A–4C are a series of flow charts showing the logic implemented by a the computer systems within the audio/ video jukebox according to the present invention.
Figure 4B:
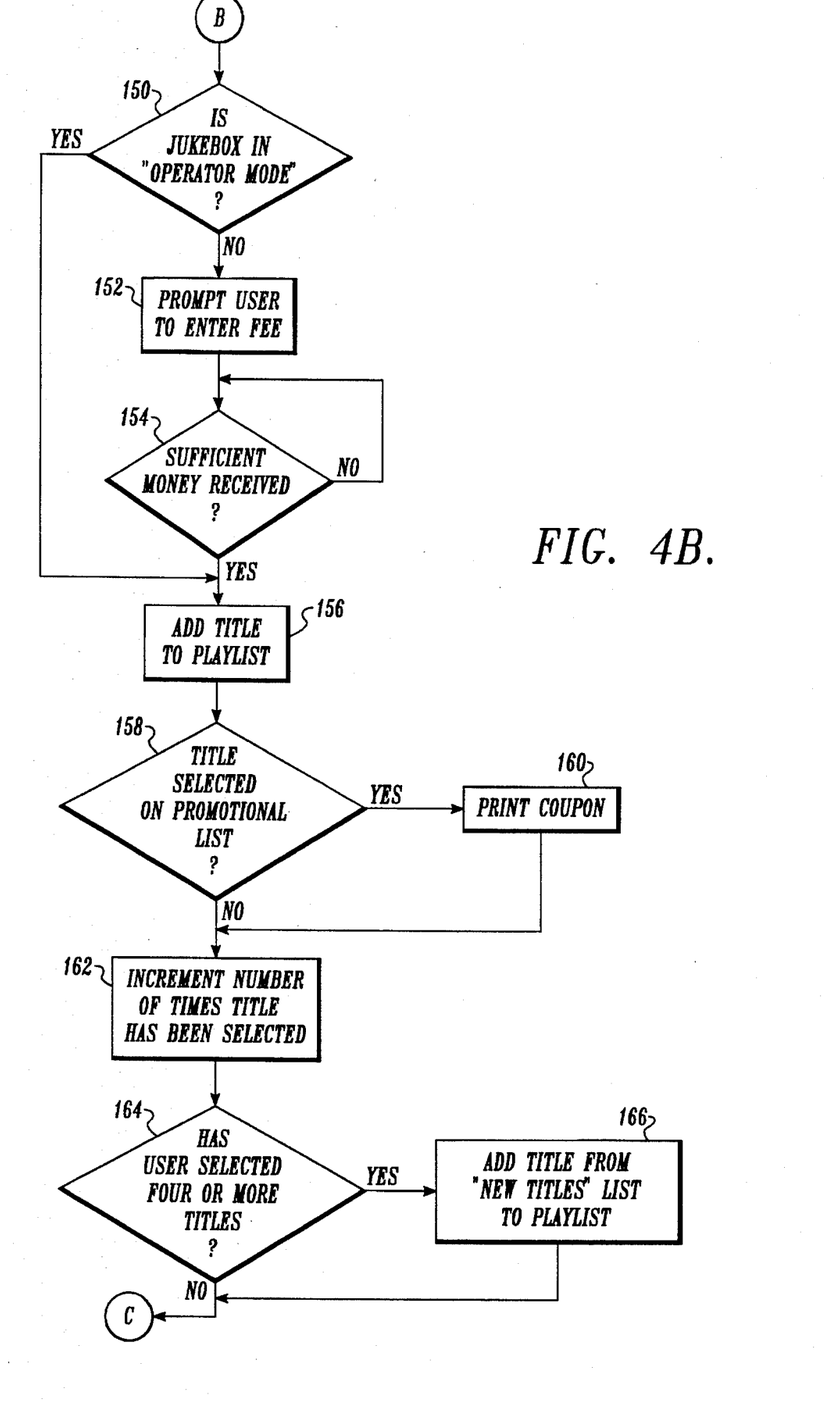
Figure 4C:
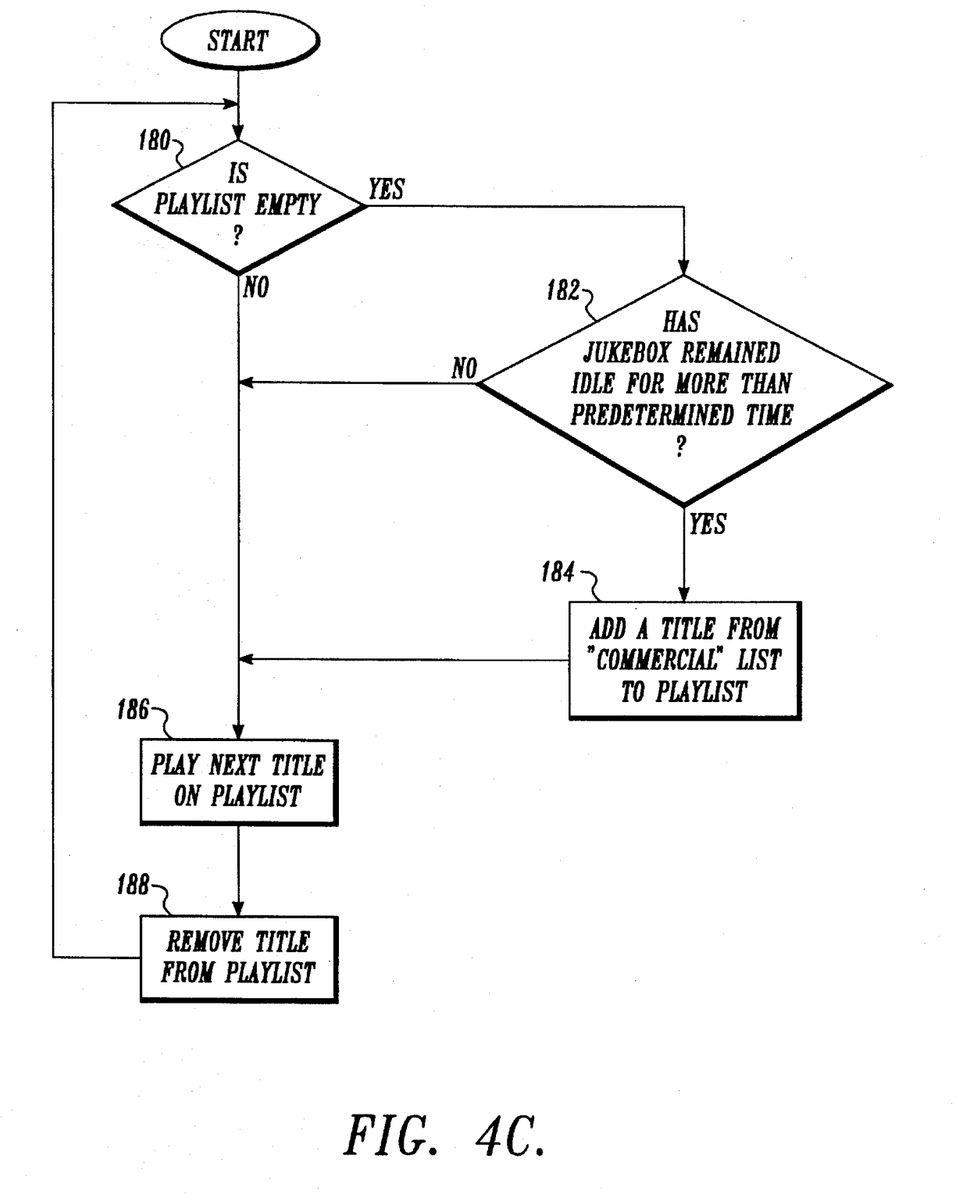

FIGS. 4A–4C are a series of flowcharts that show the logic implemented by a computer program that runs the computers within each of the jukeboxes. The computer program implemented by the computers is started when a user first turns on the jukebox. The program begins by sorting each title stored on the one or more hard disc drives into a plurality of lists. Beginning at a step 120, the computer system 50 within each jukebox reads each title on the hard disc drive and sorts the titles into one of the four format categories. The formats currently include "music" only, "video," "karaoke" and "commercial" selections. The titles on the commercial format list are not available for selection by the user, but are used to inform the computer when a coupon should be printed. The titles in the "music," and "karaoke" format lists are further sorted by genre at step 124. For example, the music and karaoke format lists are broken into three sublists for "new" titles, "rock/pop" titles, and "country" titles. Titles in the video format list are sorted into four genre categories: "new," "rock/pop," "country," and "comedy" at a step 126.

Once the titles on the hard discs have been sorted into the format and genre lists, the computer system 50A displays a selection menu that includes a series of buttons listing the available formats on the touch-sensitive screen at a step 128. The program then causes the computer system 50A to determine whether a user has selected one of the available formats at a step 130. If not, the program loops at step 130 until such a selection is made.

Once the user has selected a format, the computer program causes one or more available genre buttons on the selection menu to be highlighted on the touch sensitive screen at a step 132. At a step 134, the program determines whether the user has selected a particular genre. If no genre has been selected, the program loops back to step 134 until a genre is selected. Once a genre has been selected, the program displays the titles available along with the price to play each title for the format and genre selected at a step 136.

At a step 138, the program determines whether the user has selected a title. If no selection has been made, the program waits until a selection is made at which time the program proceeds to a step 150 (FIG. 4B).

As seen on FIG. 4B at the step 150, the program determines whether the jukebox system is operating in an "operator mode." As will be described in further detail below, when the jukebox is in the operator mode, selections can be played without depositing money into the jukebox. If the jukebox is in the operator mode, the program automatically proceeds to a step 156 and the selection is automatically added to the playlist. If the jukebox is not in the operator mode, the user is prompted at a step 152 to deposit the fee which is determined by the program in order to play the title selected. At a step 154, the program determines whether sufficient money has been received to play the title. As indicated above, the computer system 50A does this by counting the number of "m" signals received from the signal converter and comparing the number to the price of the title selected.

Once a sufficient amount of money has been received by the jukebox, the program adds the title selected to the playlist at a step 156. After step 156, the program determines at a step 158 whether the title just added to the playlist is found on a list of promotional titles also stored on the computer system 50A. If the title selected is on the list of promotional titles, then the program causes the computer 50A to read the coupon information stored on the hard drive for the title selected and print a coupon at a step 160. The steps 158 and 160 are only performed by those jukeboxes having the optional coupon printer.

At a step 162, the program sends a message to a data base, maintained by the computer system 50A, that is designed to keep track of the day and number of times a particular title is played. The data base is stored on the hard discs and is later read by the central computer system 102 (shown in FIG. 3) in order to determine the popularity of each title and to account for royalties that must be paid. After step 162, the program determines whether the user has selected four or more titles at a step 164. If so, the program automatically adds another title from the "new titles" genre list for the particular format selected onto the playlist at step 166. After step 164 or step 166, the program returns to step 130 so that a user can add more titles to the playlist. If the user selects a new format and genre button, the computer will produce a new list of titles that can be selected. Otherwise, the user can continue making selections from the list of titles for the previously selected format and genre.

FIG. 4C shows the steps of a computer program implemented by the computer system 50. As indicated above, the computer system 50 operates to play titles that have been selected by a user. The program begins at a step 180 by determining whether the playlist is empty. If the playlist is empty, the program then determines at a step 182 whether an internal timer indicates the jukebox has remained idle for more than predetermined amount of time, e.g., 5 minutes. If so, then the program causes the computer system 50 to send a message to the computer 50A so that a title is added to the playlist at a step 184. After the title is added to the playlist at step 184, the internal timer used to keep track of the idle time of the jukebox is reset.

In the presently preferred embodiment of the invention, the title selected is made from the list of commercial selections described above. In this manner, the jukebox plays commercial messages during the time when no titles have been selected by the user and the jukebox has remained idle. However, as will be appreciated, other titles could easily be added to the playlist such as those on a selection from the "new titles" list for a particular format and genre, etc. Alternatively, titles from the commercials list could be added as soon as the playlist is empty, so that the jukebox is always active.

At a step 186, the next title on the playlist is played. In the present embodiment of the invention, if the title to be played is in the "music" format (i.e., a selection without a video component), the jukebox system can display either a blank screen, a still image, or a video clip that could be a promotional piece encoded with the audio only file at the time the song was recorded in the MPEG format by the central computer system 102 described above. If the title is not in the "music" format, then the title, including both audio and video components, is played. After the title has finished playing, the title is removed from the playlist at a step 188. After step 188, the program loops back to step 180.

As indicated above, the presently preferred embodiment of the invention allows a user to play selections without depositing money. For example, if the owner of the jukebox wishes to act as a disc jockey, selections can be played without having to pay for each song separately. The jukebox is placed in the "operator mode" by pressing one or more points on the touch-sensitive screen either in a predetermined order or within a predetermined time interval so as to create an access code. However, as will be appreciated, other mechanisms for entering a code such as displaying a set of alphanumeric keys that are touched by user to enter a password that is compared to a password stored in the memory of the computer, could also be used. Once the user has placed the jukebox in the "operator mode," the jukebox adds the titles selected to the playlist without requiting the user to deposit money. The jukebox remains in the "operator mode" until the operator exists back to a "pay for play" mode by entering another code on the touch sensitive screen. When the computer within the jukebox is first started, the jukebox is automatically placed in a "pay for play" mode.

Figure 5:
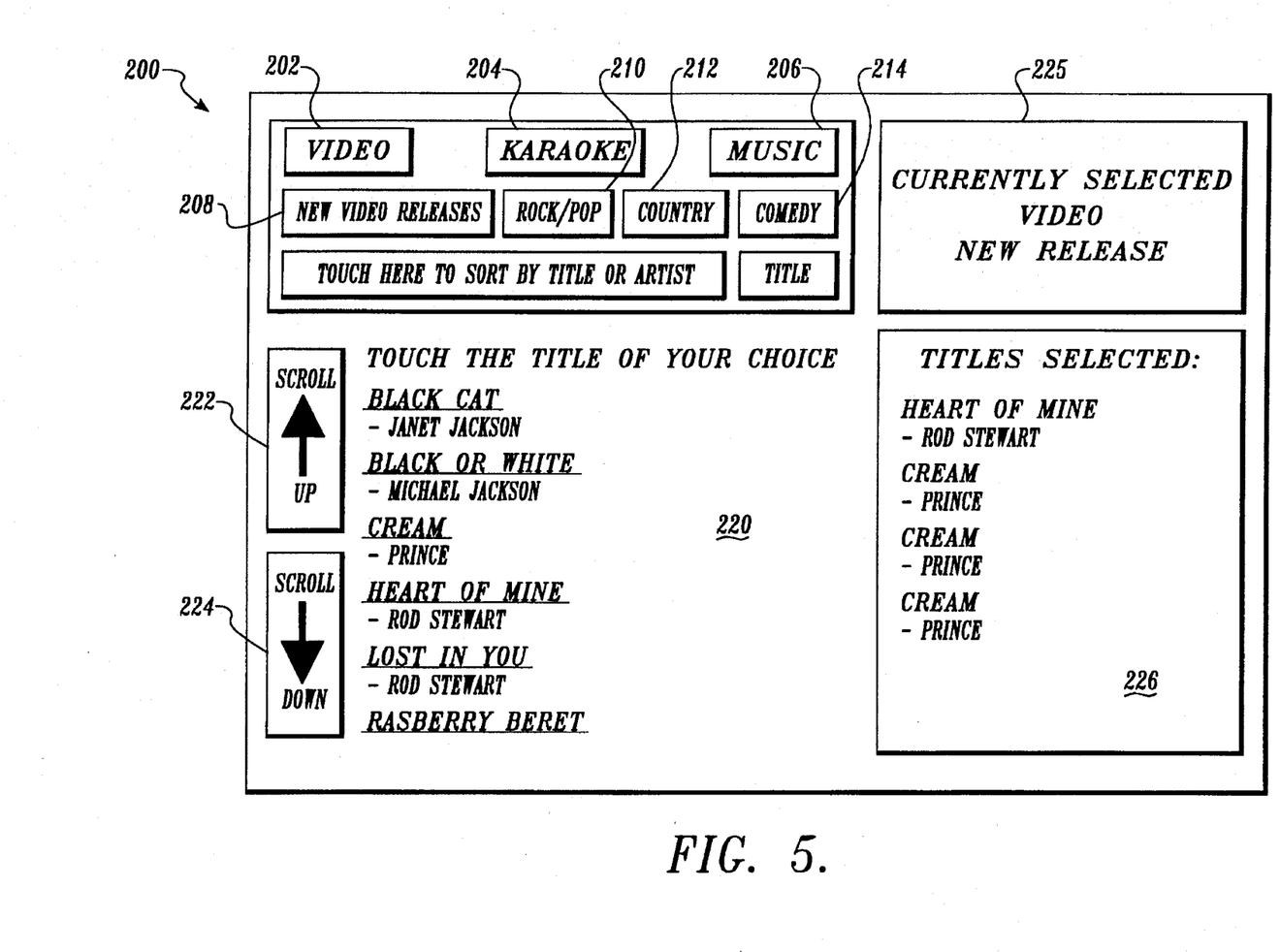
FIG. 5 is a screen display showing a selection menu produced by the audio/video jukebox system of the present invention.

FIG. 5 shows a representative menu display 200 produced on the touch sensitive screen 18 shown in FIGS. 1 and 2. The display includes a plurality of "buttons" that are selected by the user by placing his or her finger at a location directly on the particular button displayed on the touch sensitive screen. At the top of the display are three format buttons 202, 204, 206 that allow the user to view titles on the jukebox by the various format types described above. The "video" format button 202 allows the user to view a list of all the video titles on the jukebox. To the right of the video format button 202 is a "karaoke" format button 204. By selecting the karaoke button, the user is able to view a list of all the karaoke titles on the jukebox system. A "music" format button 206 is located to the tight of the karaoke button 204. When the user selects the music format button, the user is able to view a list of all the music titles on the jukebox.

Below the format buttons are four genre buttons. A "new video releases" button 208 allows a user to see a list of all the new video titles corresponding to the format selected. For example, if the user selects the "video" format button 202 and the "new video releases" genre button 208, the user is shown a list of the new video titles in a display area 220. The genre buttons also include a "rock/pop" button 210, a "country" button 212, and a "comedy" button 214. Preferably, each of the genre buttons is dimmed when the selection is not available for the format selected. For example, the "comedy" genre button is not available for the karaoke or for the music formats, and therefore is dimmed when the user has selected format buttons 204 or 206.

After selecting a format button and a genre button, the jukebox displays the titles available for that particular format in the display area 220 that is located below the format buttons. A user can review the entire list of titles displayed in the area 220 using a scroll up button 222 and a scroll down button 224 located at the left of the area 220.

In the upper right-hand corner of the display 200 is a second display area 225 that shows what format and genre the user has currently selected. In the example shown FIG. 5, the display area 225 indicates the user is being shown new release videos. Below the display area 225 is a title selected area 226 that shows which titles have currently been selected for play. By touching the touch sensitive screen at a position on top of the title and depositing the requisite amount of money, the title will appear in the title selected area 226.

As can be seen, the present invention is a jukebox entertainment system that allows numerous types of entertainment formats to be played on a single unit. For example, in addition to video, karaoke, and music selections, a user could play clips of favorite sporting or historical news events, etc. In addition, the jukebox offers greater flexibility than with prior art jukeboxes. For example, selections can be shown to the user based upon their popularity or by a particular format such as sports or comedy, etc. Furthermore, because the jukebox does not contain any complex mechanical mechanisms, the jukebox has a greater reliability rating than prior art jukeboxes, which require that records, CDs, or video tapes be mechanically loaded into a central player after selection by a user.

The preferred embodiment of the present invention has been described above. However, it should be apparent that various modifications may be made without departing from the spirit and scope of the invention.

The embodiments of the invention in which an exclusive property or privilege is claimed are defined as follows:

1. An audio/video jukebox entertainment system comprising:

a computer system;

one or more removable hard disc drives coupled to the computer system, each removable hard disc drive being adapted to read a hard disc having prerecorded digital audio/video data that comprises a plurality of audio/video titles stored thereon;

selection means, coupled to the computer system, for allowing a user to select one or more audio/video titles to be played, the computer system including means for reading the prerecorded digital audio/video data corresponding to the selected audio/video title from one or more of the removable hard disc drives;

a decoder coupled to the computer system for converting the digital audio/video data read from the one or more removable hard disc drives to analog audio/video signals;

a monitor coupled to the decoder for displaying the analog video signals;

an audio amplifier connected to the decoder board for amplifying the analog audio signals; and one or more loudspeakers coupled to the audio amplifier for converting the audio signals to sound.

2. The audio/video jukebox of claim 1 wherein the computer system comprises:

a first computer system for reading the prerecorded digital audio/video data from the one or more removable hard disc drives and a second computer system networked to the first computer system for controlling the selection means.

3. The audio/video jukebox of claim 1, further comprising:

a video tape recorder having a video output coupled to the television monitor and an audio input coupled to the audio amplifier; and a video camera having an output coupled to the video tape recorder, said video tape recorder and said video camera operating to allow a user to record their image on a video tape.

4. The audio/video jukebox of claim 1, further comprising:

a microphone that is connectable to the audio amplifier for amplifying the voice of a user with the audio title played by the jukebox.

5. The audio/video jukebox of claim 1, wherein the selection means includes a touch sensitive video screen.

6. The audio/video jukebox of claim 5, wherein the selection means further comprises:

means for receiving money from a user and for normally actuating the selection means only if at least a predetermined amount of money has been received; and means for determining if a user has actuated one or more predetermined locations on the touch sensitive screen and, if so, allowing a user to play audio/video selections without receipt of money.

7. The audio/video jukebox of claim 1, including means for receiving money from a user, said money receiving means comprising:

a money validator for receiving money and for generating a signal indicative of the amount of money received; and a signal converter circuit, connected to receive the signal indicative of the amount of money received, the signal converter circuit producing a computer keystroke signal that is applied to a keyboard input of the computer system to indicate money has been received by the jukebox.

8. The audio/video jukebox of claim 1, further comprising:

means for allowing a user to view a list of the audio/video titles stored on the one or more removable hard disc drives sorted by format 9. The audio/video jukebox of claim 8, further comprising:

means for allowing a user to view a list of the audio/video titles stored on the one or more removable hard disc drives sorted by format and genre.

10. The audio/video jukebox of claim 1, further comprising:

a coupon printer that prints a coupon for an item when a particular title on the one or more removable hard disc drives is selected by a user.

11. The audio/video jukebox of claim 10, further comprising:

means for storing a list of the titles on the one or more removable hard disc drives for which a coupon will be printed by the coupon printer.

12. The audio/video jukebox of claim 1, wherein a portion of the audio/video data stored on the one or more removable hard disc drives corresponds to a commercial message.

13. The audio/video jukebox of claim 12, further comprising:

means for determining if the jukebox has sat idle for more than a predetermined amount of time and, if so, for reading the audio/video data corresponding to the commercial message and applying the data to the decoder.

14. A jukebox entertainment system, comprising:

one or more removable hard disc drives having prerecorded audio data corresponding to one or more titles stored thereon as well as coupon information that is associated with at least one of the titles;

selection means for allowing a user to select a title to be played;

a computer system including means for reading the prerecorded audio data corresponding to a selected title from the one or more removable hard disc drives and for converting the prerecorded audio data to an analog audio signal;

an amplifier for amplifying the analog audio signal;

one or more loudspeakers for convening the amplified analog audio signal to sound; and means for printing a coupon with a coupon that contains the coupon information when a user selects a title that is associated with the coupon information.

15. The jukebox entertainment system of claim 14, wherein the digital memory device has video data stored thereon and the computer system further includes:

means for reading the video data from the digital memory device and for convening the video data to an analog video signal.

16. The jukebox entertainment system of claim 15, further comprising:

a monitor for displaying the analog video signal.

* * * * *

UNITED STATES PATENT AND TRADEMARK OFFICE
CERTIFICATE OF CORRECTION

PATENT NO. : 5,481,509                                    Page 1 of 3
DATED      : January 2, 1996
INVENTOR(S): N. Knowles It is certified that error appears in the above-indentified patent and that said Letters Patent is hereby corrected as shown below:

COLUMN     LINE

| | | |
|---|---|---|
| 10 (Claim 8, | 28 line 5) | After "format" insert --.-- |
| 11 (Claim 14, | 1 line 14) | "convening" should read --converting-- |
| 11 (Claim 14, | 3 line 16) | After "printing a coupon" delete --with a coupon-- |
| 12 (Claim 15, | 1-2 lines 4-5) | "digital memory device" should read --one or more removable hard disc drives-- |
| 12 (Claim 15, | 2 line 5) | "convening" should read --converting-- |

UNITED STATES PATENT AND TRADEMARK OFFICE
CERTIFICATE OF CORRECTION

PATENT NO. : 5,481,509                                            Page 2 of 3
DATED : January 2, 1996
INVENTOR(S) : N. Knowles It is certified that error appears in the above-indentified patent and that said Letters Patent is hereby corrected as shown below:

| COLUMN | LINE | |
|---|---|---|
| 1 | 15 | "modem" should read --modern-- |
| 1 | 18 | "modem" should read --modern-- |
| 2 | 3 | "convening" should read --converting-- |
| 2 | 19 | "primer" should read --printer-- |
| 2 | 53 | After "by" delete --a-- |
| 2 | 64 | "from" should read --front-- |
| 4 | 30 | After "merchant" insert --,-- |
| 6 | 28 | ""music,"" should read --"music"-- |
| 7 | 40 | After "than" insert --a-- |
| 8 | 17 | "requiting" should read --requiring-- |
| 8 | 19 | "exists" should read --exits-- |
| 8 | 36 | "tight" should read --right-- |
| 8 | 61 | After "shown" insert --in-- |

UNITED STATES PATENT AND TRADEMARK OFFICE
CERTIFICATE OF CORRECTION

PATENT NO. : 5,481,509
DATED : January 2, 1996
INVENTOR(S) : N. Knowles

It is certified that error appears in the above-indentified patent and that said Letters Patent is hereby corrected as shown below:

| COLUMN | LINE | |
|--------|------|---|
| 12 | 2 | "convening" should read --converting--. |

Signed and Sealed this

Sixth Day of August, 1996

Attest:

BRUCE LEHMAN

Attesting Officer

Commissioner of Patents and Trademarks